(12) United States Patent
Link et al.

(10) Patent No.: US 9,126,221 B2
(45) Date of Patent: Sep. 8, 2015

(54) SYSTEM FOR COATING OBJECTS HAVING A COATING BOOTH AND AN ELECTROSTATICALLY OPERATING SEPARATION UNIT

(75) Inventors: Kersten Link, Grafenau (DE); Werner Schuster, Calw (DE)

(73) Assignee: EISENMANN AG, Boeblingen (DE)

( * ) Notice: Subject to any disclaimer, the term of this patent is extended or adjusted under 35 U.S.C. 154(b) by 247 days.

(21) Appl. No.: 13/577,299

(22) PCT Filed: Jan. 29, 2011

(86) PCT No.: PCT/EP2011/000414
§ 371 (c)(1),
(2), (4) Date: Aug. 6, 2012

(87) PCT Pub. No.: WO2011/098222
PCT Pub. Date: Aug. 18, 2011

(65) Prior Publication Data
US 2012/0304925 A1    Dec. 6, 2012

(30) Foreign Application Priority Data

Feb. 9, 2010    (DE) .......................... 10 2010 007 479

(51) Int. Cl.
| | | |
|---|---|---|
| *B03C 3/16* | (2006.01) | |
| *B03C 3/34* | (2006.01) | |
| *B03C 3/78* | (2006.01) | |
| *B05B 15/12* | (2006.01) | |

(Continued)

(52) U.S. Cl.
CPC ............... *B05B 15/1244* (2013.01); *B03C 3/08* (2013.01); *B03C 3/16* (2013.01); *B03C 3/53* (2013.01); *B05B 15/1281* (2013.01); *B03C 3/47* (2013.01); *B03C 3/78* (2013.01); *B03C 2201/04* (2013.01); *Y10S 55/46* (2013.01)

(58) Field of Classification Search
CPC .............. B03C 3/47; B03C 3/16; B03C 3/08; B03C 3/53; B03C 3/78; B05B 5/1262; B05B 15/1281; Y10S 55/46
See application file for complete search history.

(56) References Cited

U.S. PATENT DOCUMENTS 1,959,752 A *  5/1934  Wintermute ...................... 96/49
3,000,641 A *  9/1961  Walborn ....................... 222/192

(Continued)

FOREIGN PATENT DOCUMENTS

DE          4 018 488 C1    10/1991
DE          40 90 626 T      4/1992

(Continued)

*Primary Examiner* — Dah-Wei D Yuan
*Assistant Examiner* — Binu Thomas
(74) *Attorney, Agent, or Firm* — Factor Intellectual Property Law Group, Ltd.

(57) ABSTRACT

A system for coating objects, comprising a coating booth and an electrostatically operating separation unit. A feeding device, by which deposition liquid can be fed to the upper region of each deposition surface, is assigned to each deposition electrode of the deposition unit. The feeding device has a feed channel which can be filled with deposition liquid and which in the lower region thereof is formed by two spring plates. Two slide plates are also seated against the opposite deposition surfaces of the deposition electrode and can be moved back and forth between a position in which the lower edges of said slide plates are located above the lower edges of the spring plates and a position in which the lower edges of said slide plates are located below the lower edges of the spring plates.

4 Claims, 10 Drawing Sheets

(51) Int. Cl.
  *B03C 3/08* (2006.01)
  *B03C 3/53* (2006.01)
  *B03C 3/47* (2006.01)

(56) References Cited

U.S. PATENT DOCUMENTS

| | | | |
|---|---|---|---|
| 4,318,718 A * | 3/1982 | Utsumi et al. | 96/51 |
| 5,137,546 A | 8/1992 | Steinbacher et al. | |
| 5,160,510 A | 11/1992 | Steinbacher et al. | |
| 5,264,014 A | 11/1993 | Lannefors et al. | |
| 2008/0216659 A1 | 9/2008 | Maekawa et al. | |
| 2010/0291848 A1 * | 11/2010 | Swoboda et al. | 454/53 |
| 2011/0203459 A1 * | 8/2011 | Swoboda et al. | 96/62 |
| 2013/0032089 A1 * | 2/2013 | Link et al. | 118/620 |

FOREIGN PATENT DOCUMENTS

| | | |
|---|---|---|
| EP | 2 011 575 A1 | 1/2009 |
| WO | WO 2010025812 A1 * | 3/2010 |
| WO | WO 2011072796 A1 * | 6/2011 |

* cited by examiner

SYSTEM FOR COATING OBJECTS HAVING A COATING BOOTH AND AN ELECTROSTATICALLY OPERATING SEPARATION UNIT

RELATED APPLICATIONS

This application claims the filing benefit of International Patent Application No. PCT/EP2011/000414, filed Jan. 29, 2011, which claims the filing benefit of German Patent Application No. 10 2010 007 479.9 filed Feb. 9, 2010, the contents of both of which are incorporated herein by reference.

TECHNICAL FIELD AND BACKGROUND OF THE INVENTION

The invention relates to a system for coating, in particular painting, objects, in particular vehicle bodies, having
 a) a coating booth in which the objects may be acted upon by coating material and through which an air stream can be conducted which takes up the overspray particles of the coating material and conveys them away;
 b) an electrostatically operating separating device whereof the housing has an inlet opening for the overspray-particle-laden air and an outlet opening for the cleaned air, wherein at least one separating electrode, which has a separating surface, and a counter electrode device are arranged in the housing;
 c) a high voltage source whereof the poles may be connected to the separating electrode or the counter electrode device;
 d) an air path for the overspray-particle-laden air, which leads from the base of the coating booth to the inlet opening of the separating device.

When paints are applied manually or automatically to objects, a substream of the paint, which generally contains both solid bodies as well as solvent and/or binding agent, does not reach the object. This substream is known among experts as "overspray". The overspray is taken up by the air stream in the coating booth and supplied for separation so that, if required, the air can be conducted back to the coating booth after suitable conditioning.

Particularly in systems with a relatively high paint consumption, for example in systems for painting vehicle bodies, wet separation systems are preferably used. In commercially known wet separators, water flows together with the booth exhaust air coming from above to a nozzle accelerating the air stream. A swirling of the through-flowing booth exhaust air with the water takes place in this nozzle. During this procedure, the overspray particles largely pass over into the water so that the air exiting the wet separator has been substantially cleaned and the paint overspray particles are located in the water. They can then be recovered from this or disposed of. In known wet separators, a relatively high amount of energy is needed to circulate the very large quantities of water required and to overcome the pressure differences between booth, nozzle and disposal area. Treating the rinsing water is costly due to the elevated use of paint-binding and detackifying chemicals and the disposal of paint sludge. Furthermore, as a result of the intensive contact with the rinsing water, the air absorbs a great deal of moisture which, in recirculating-air mode, in turn leads to a high energy consumption for treating the air or, with a high moisture or solvent content, means that the exhaust air has to be rejected.

In contrast, in commercially known devices of the type mentioned at the outset, a dry separation process is used in that paint overspray particles which are entrained by the booth air flowing past are ionised by the counter electrode device of the electrically operating separating device and, owing to the electrical field established between the separating electrode and the counter electrode device, migrate to the separating surface of the separating electrode, on which they are separated.

In known systems of the type mentioned at the outset, the overspray particles adhering to the separating surface are stripped off this mechanically and transported away.

SUMMARY OF THE INVENTION

An object of the present invention is to construct a system of the type mentioned at the outset in such a way that the operation of the electrostatic separating device is less problematic and, in particular, the overspray particles can be removed more easily from the separating surface.

This object may be achieved according to the invention in that
 e) a supply device is associated with each separating electrode and enables separating fluid to be supplied to the upper region of each separating surface of the separating electrode in such a way that the separating fluid flows extensively over each separating surface of the separating electrode;
 f) the supply device has a supply channel which may be filled to a certain level with separating fluid and is formed in its lower region by two spring steel plates which lie at least sometimes and at least partially with their lower edges against the opposite operating surfaces of the separating electrode;
 g) two sliding plates are provided, which lie displaceably against the opposite separating surfaces of the separating electrode;
 h) an actuating device is provided, by means of which the sliding plates can be moved back and forth between a position in which their lower edges are located above the lower edges of the spring steel plates and a position in which their lower edges are located below the lower edges of the spring steel plates.

According to the invention, therefore, the overspray particles are taken up at the separating surface by a separating fluid by means of which they can be transported away. The quantities of separating fluid required for this are relatively low, so that the above-mentioned problems which arise with wet separators are of no consequence. It goes without saying that the separating fluid has to be adapted to the overspray particles; it can also contain additives which facilitate the subsequent removal of the overspray particles from the separating fluid.

The inventive design of the supply device for the separating fluid with a supply channel which is formed in the lowest region of two spring steel plates represents a particularly simple way of supplying the separating surfaces of the separating electrode with separating fluid. The latter simply "leaks" through the not quite leak-tight gap between the lower edges of the spring steel plates and the separating surfaces of the separating electrode.

The two sliding plates, which actively contribute to the separating fluid being discharged from the supply channel as a result of their reciprocal movement, are provided to ensure an adequate, continuous and extensive flow from the supply channel even with more highly viscous separating fluids. Moreover, the gap between the separating electrode and the spring steel plates is reliably prevented from becoming blocked by possibly entrained paint particles.

In a preferred embodiment of the system according to the invention, the lower edges of the spring steel plates have a crenellated shape or resemble a blunt comb. This design also contributes to the separating fluid exiting the supply channel onto the separating plates in the correct quantity and in the correct distribution. The geometry of the "crenellations" or the clearances between the comb teeth can be selected according to the particular requirements.

In addition, a device is preferably provided by means of which the lower edges of the spring steel plates can be moved away from the system at the separating surfaces of the separating electrode to the extent that the contents of the supply channel can run out. It is thus possible to clean the supply channel from time to time, which requires the supply channel to be fully emptied.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Exemplary embodiments of the invention are explained in more detail below with reference to the drawing, which shows.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 1:
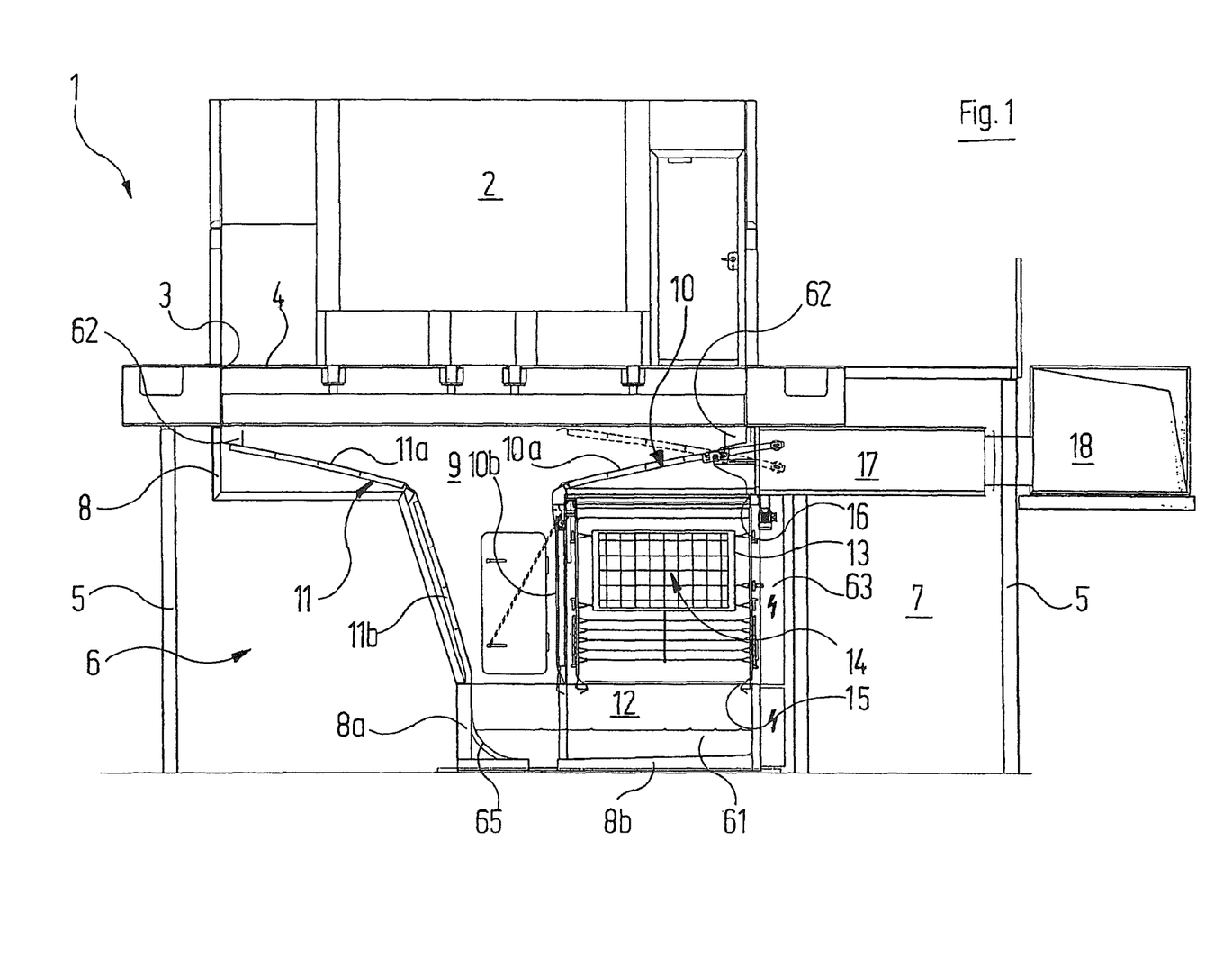
FIG. 1 a vertical partial section through a paint system for painting vehicle bodies.

Reference is firstly made to FIG. 1, in which a paint system for painting vehicle bodies is shown. It is denoted as a whole by the reference numeral 1. In the upper half, part of a paint booth 2 is shown, which is designed in known manner and therefore does not need to be explained in more detail below. The vehicle bodies to be painted are conveyed continuously or intermittently perpendicularly to the plane of the drawing of FIG. 1 with the aid of a transport system (not illustrated) and, during this, are acted upon by paint from application devices (likewise not illustrated).

An air plenum which is located above the paint booth 2 is moreover not shown specifically.

Conditioned air is introduced into the interior of the paint booth 2 in a uniform flow from this air plenum by way of a filter cover. It flows downwards there, takes up the paint overspray which has not adhered to the vehicle bodies and exits the paint booth 2 through a large-scale lower opening 3 covered by an accessible grating 4.

The entire paint booth 2 rests on a steel structure 5 as is known per se.

Located below the paint booth 2, there is a system region 6 in which the overspray-particle-laden air exiting the paint booth 2 by way of the opening 3 is cleaned again. The system region 6 comprises a separating chamber 9 which, apart from the upper opening 3 and further openings serving for the air to pass through, is closed on all sides by walls 8. Two deflector plates 10 and 11 are located inside the separating chamber 9. The left deflector plate 11 in FIG. 1 has a larger portion 11a which slopes relatively gently from the outside in and a more sharply sloping portion 11b adjoining the portion 11a. In similar manner, the deflector plate 10, which is shown on the right in FIG. 1, has an outer portion 10a which slopes relatively gently from the outside in and a portion 10b which adjoins this portion 10a and leads perpendicularly downwards in the exemplary embodiment shown. The portion 10a can be pivoted out of the operating position shown by a continuous line into a maintenance position shown by a dashed line. In similar manner, the portion 10b can be pivoted from the vertical operating position into a maintenance position.

From laterally mounted distributing channels 62, a separating fluid can flow downwards onto the deflector plates 10 and 11 in a more or less cohesive layer on their upper surface.

A transition chamber 12 is located below the chamber delimited on opposite sides by the two deflector plates 10 and 11. A deflector plate 65, which extends in curved manner between the wall 8a and the base 8b of the transition chamber 12, ensures a flow-promoting transition of the air into the transition chamber.

A receiving chamber 13 for an electrostatically operating separating device (denoted as a whole by the reference numeral 14) is provided above the right-hand region of the transition chamber 12 in FIG. 1, to the right of the vertically extending portion 10b of the deflector plate 10. The receiving chamber 13 is in communication with the transition chamber 12 by way of a lower opening 15 and with the chamber below the portion 10a of the deflector plate 10 by way of an upper opening 16 and, from this chamber, with an air collecting channel 18 by way of a horizontally aligned air channel 17. The latter leads to an air conditioning device (not illustrated) by means of which the cleaned air is brought back to the correct temperature and humidity so that it can be conducted to the air plenum above the paint booth 2 again. In known manner, the volume of the recirculated air is selected subject to non-removable substances.

Reference is now made to FIGS. 2 to 6 to describe the separating device 14. As shown in the perspective view of the separating device 14 in FIG. 2, this comprises a housing 19 which is substantially open to the bottom, front and top. A plurality of separating units 21 and 22, which are designed as slide-in elements and have different widths, are located next to one another inside the housing 19.

Figure 3:
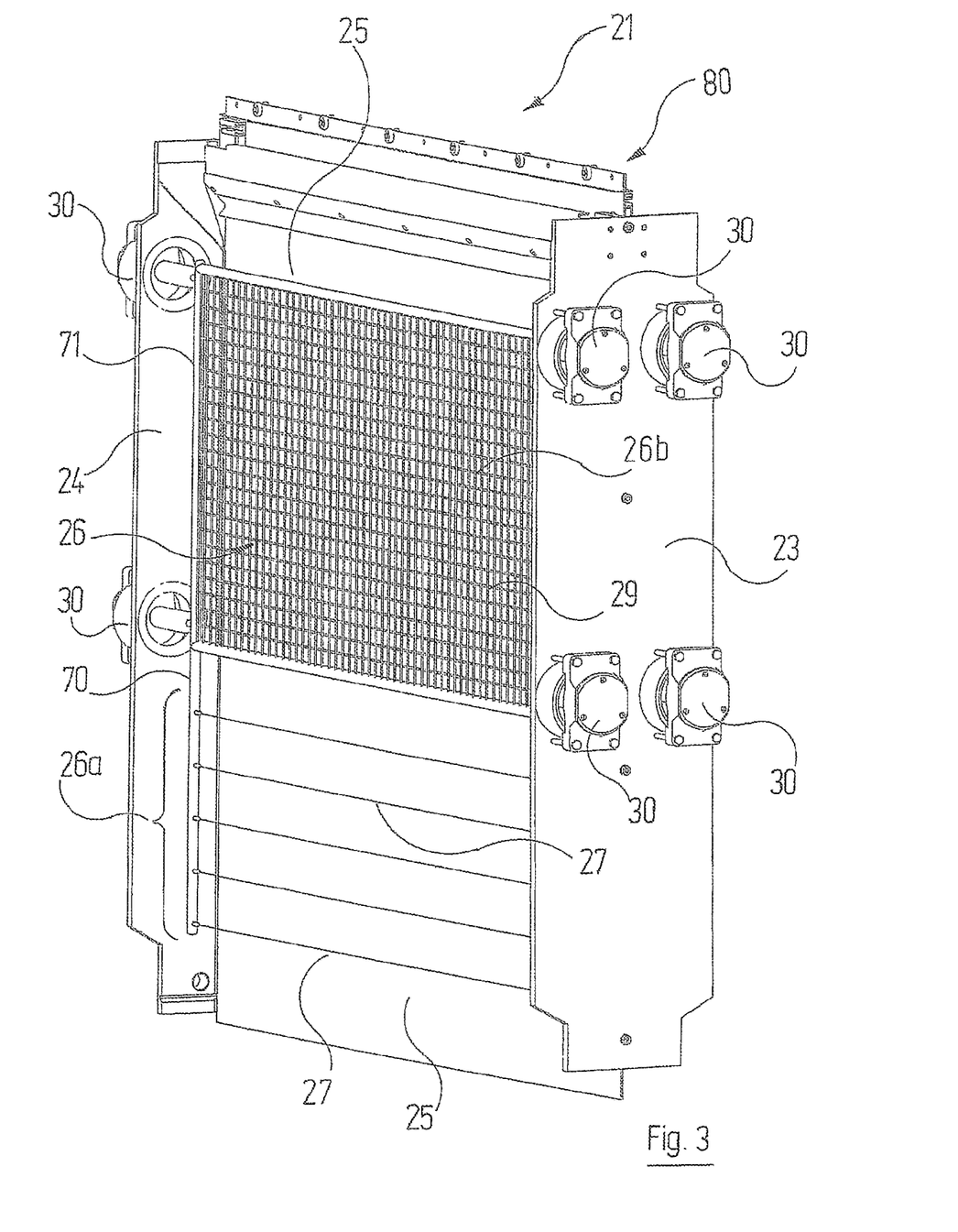
FIG. 3 a perspective view of a first type of separating unit from the separating device of FIG. 2.

The essential construction of the wider separating units 21 is shown in FIG. 3. Each separating unit 21 comprises a front end plate 23 and a rear end plate 24. Extending between the two end plates 23 and 24, connected to these in the centre, there is a plate-shaped separating electrode 25 which is aligned vertically in the operating state. A respective counter electrode device 26 is provided on both sides of the separating electrode 25. In FIG. 3, only one of these counter electrode devices 26 is shown; the second, which is of an identical construction, is arranged behind the separating electrode 25 and is covered by this in FIG. 3.

The counter electrode device 26 has a lower corona region 26a in which, in the exemplary embodiment shown, five corona wires 27 are provided which extend parallel to one another and at a spacing from the separating electrode 25 between a holding rod (covered in FIG. 3) adjacent to the front end plate 23 and a corresponding holding rod 70 adjacent to the rear end plate 24 and are electrically connected to these holding rods 70.

A field region 26b of the counter electrode device 26 is located above the corona region 26a. This field region 26b is physically realised by a grid-like field electrode 29 which is mounted parallel to the separating electrode 25, at a spacing therefrom, in a metal frame 71. The field electrode 29 is electrically connected to the frame 71 which is again in turn electrically connected to the holding rods 70 so that the field electrode 29 and the corona wires 27 are therefore substantially at the same potential.

Holding means 30 serve to secure the frame 71 and therefore the entire counter electrode device 26 on the front end plate 23 and the rear end plate 24. All the holding means 30 are constructed as insulators; two holding means 30 on the front end plate 23 additionally contain high voltage terminals.

As already mentioned above, the separating unit 21 is constructed as a slide-in element; this means that it can be pulled out of the housing 19 as a unit.

Each separating unit 21 is held inside the housing by a hollow profile 36 which forms a rail and on the underside of which a continuous gap 38 is formed. This is shown in particular in FIGS. 4 to 6.

Figure 4:
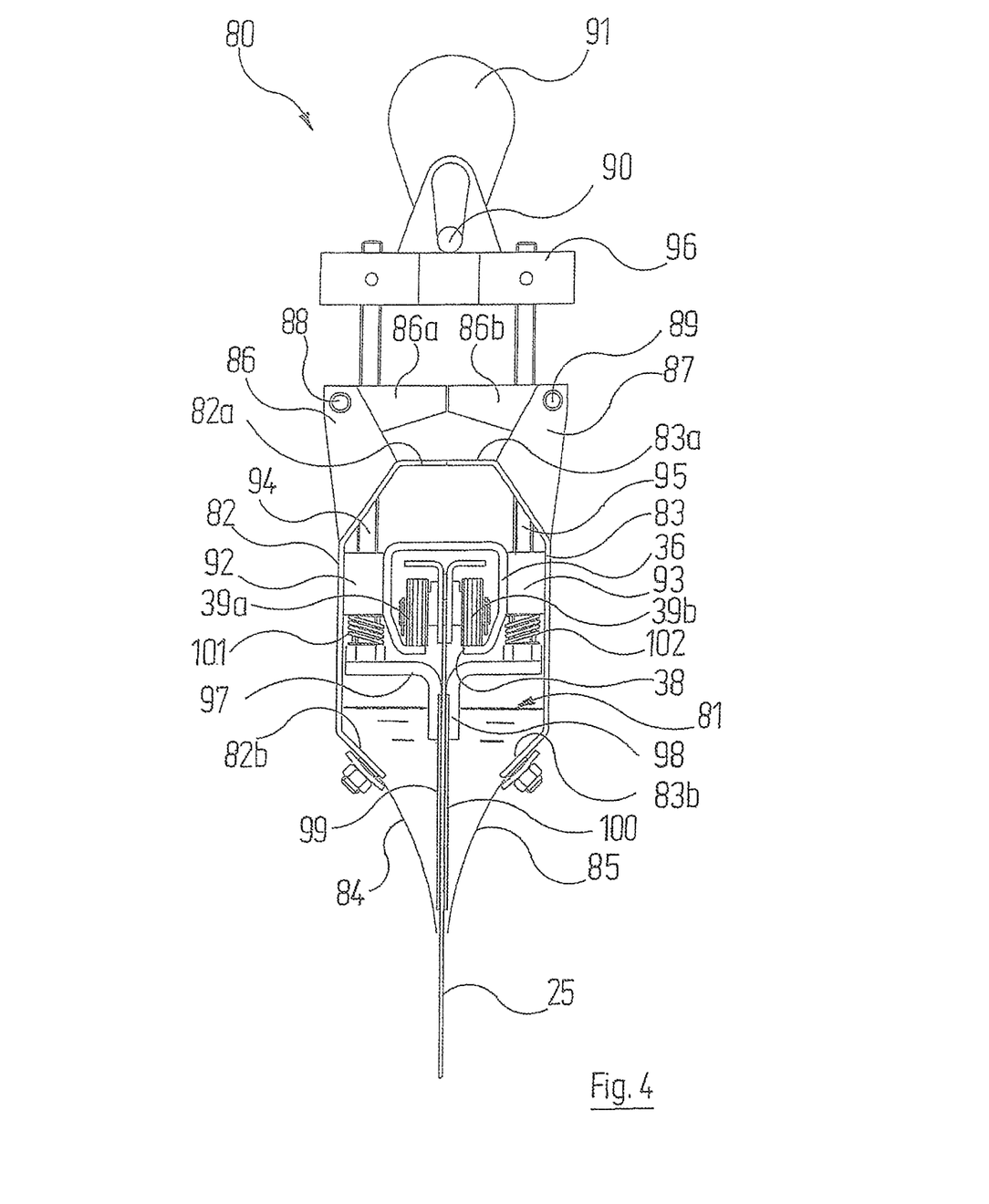
FIGS. 4 to 6 the end view of a supply device for a separating fluid and an associated separating electrode in different operating positions.
Figure 5:
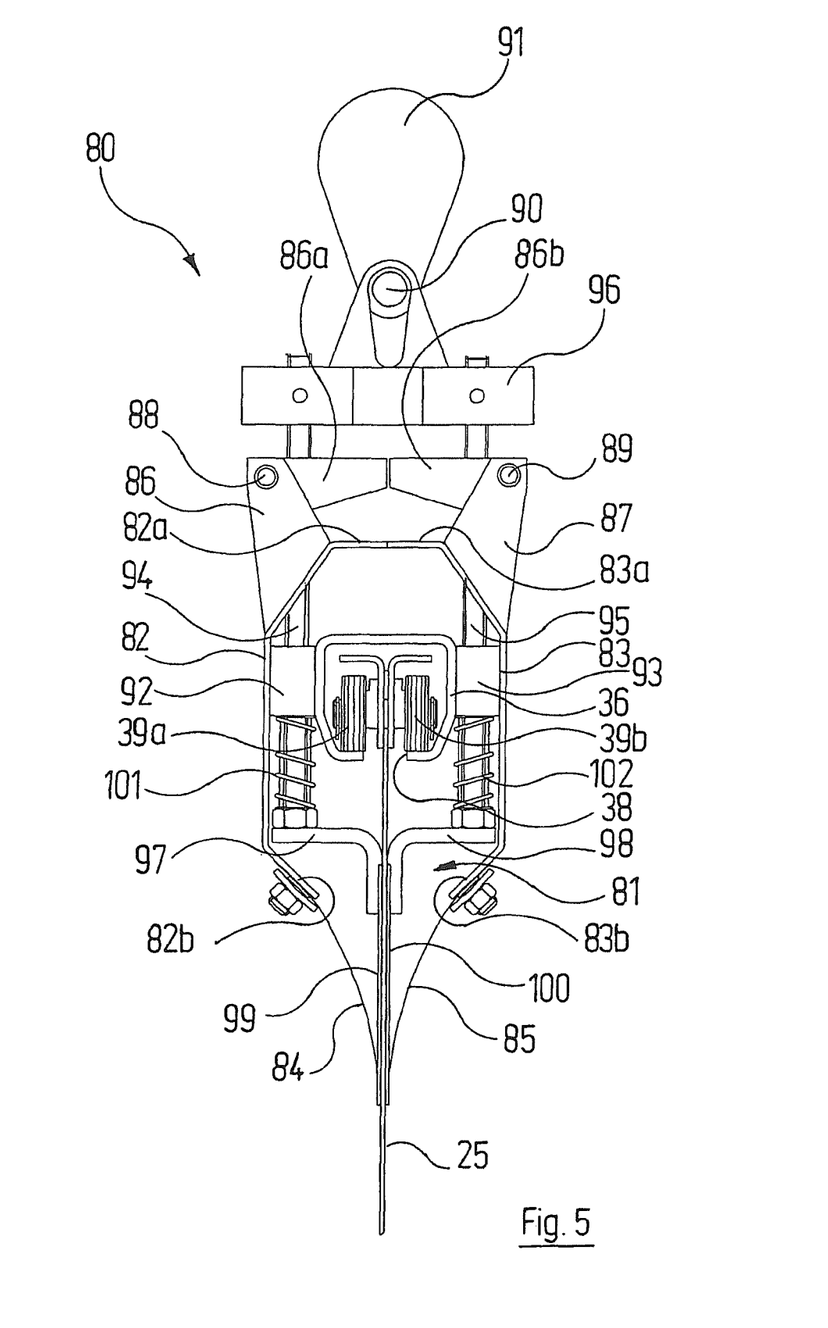
Figure 6:
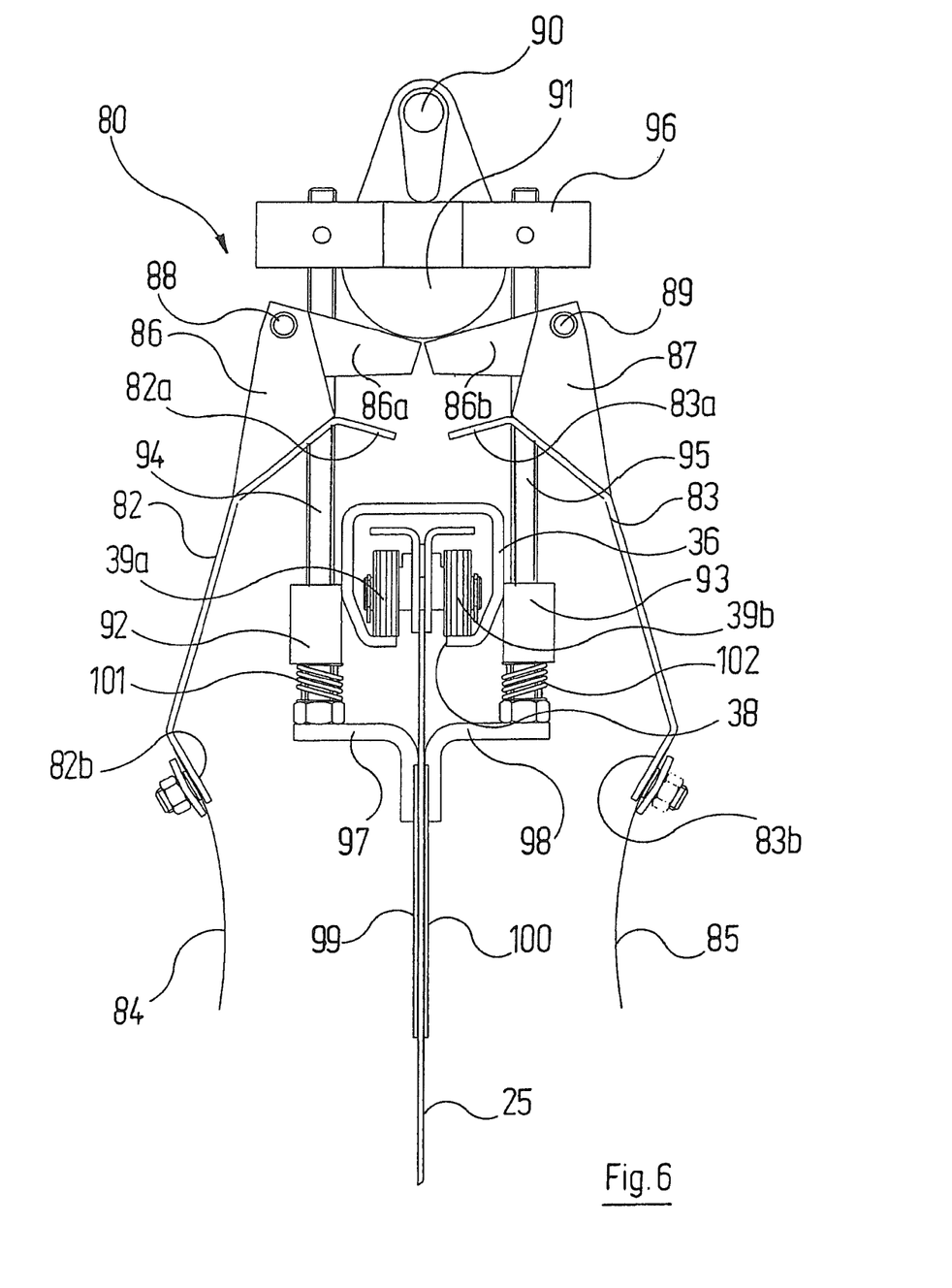

The separating electrode 25 reaches through the gap 38 in the rail 36 with its upper end region. A plurality of roller pairs 39a, 39b which, in FIGS. 4 to 6, are arranged at a spacing from one another perpendicularly to the plane of the drawing, are mounted at that region of the separating electrode 25 which projects upwards over the gap 38. With this construction, it is clearly possible to pull the separating unit 21 out of the housing 19, whereby the rollers 39a, 39b run in the rail 36 on the lower flanges located on both sides of the gap 38. The separating electrode 25 moves accordingly in the gap 38 until it is finally released from the rail 36. The separating unit 21 which is removed in this way can then undergo maintenance as required. The separating unit 21 is inserted analogously in the reverse manner.

Figure 2:
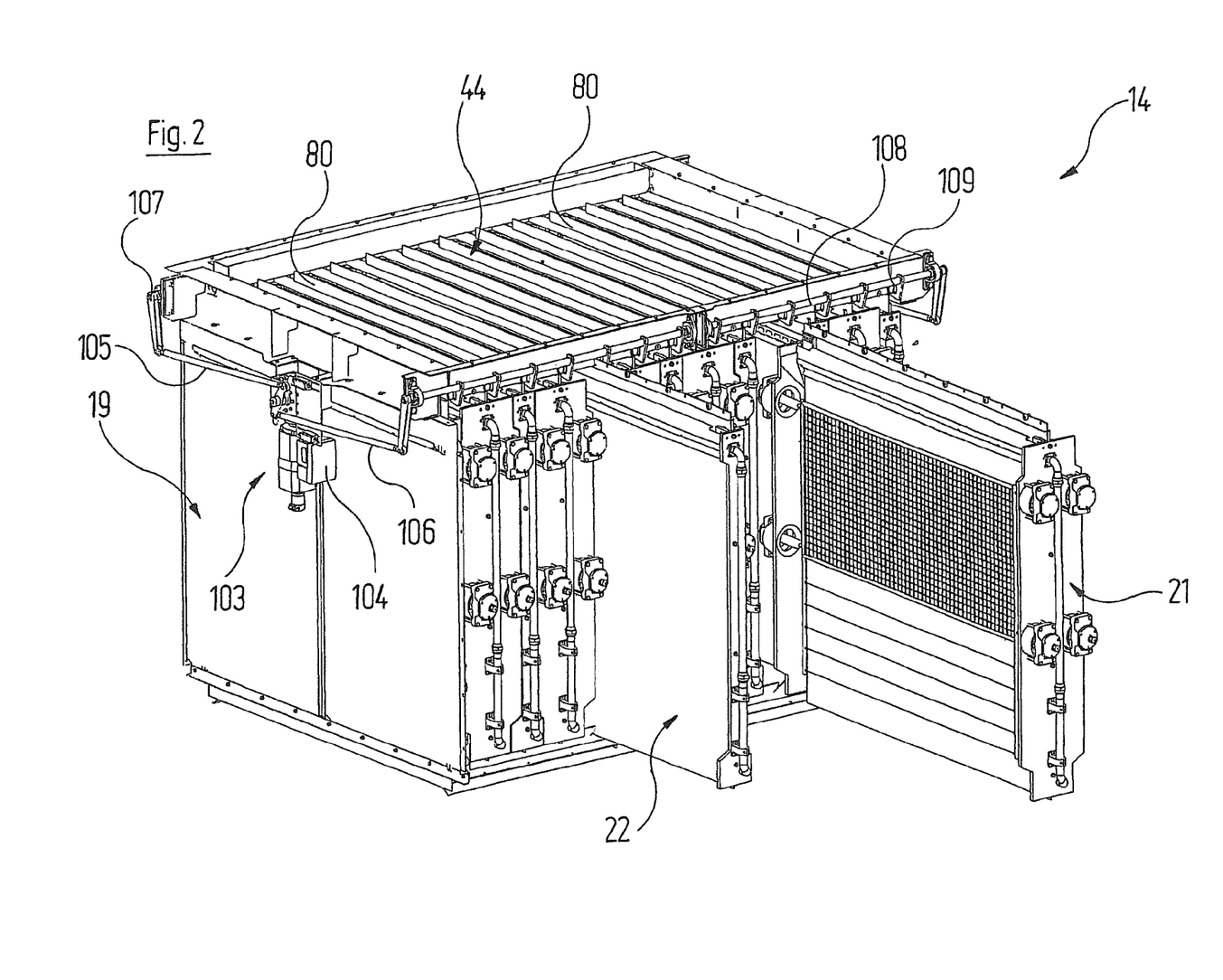
FIG. 2 a perspective view of an electrostatic separating device for paint overspray, which is used in the paint system of FIG. 1.

As shown in FIG. 2, the narrower separating units 22 alternate with the wider separating units 21, with the wider separating units 21 always being provided at the outer edge of the housing 19. The narrower width of the separating units 22 is due to these not having a counter electrode device on both sides of the separating electrode.

As a result of the alternating arrangement and the two types of separating units 21, 22 within the separating device 14, it is ensured that a counter electrode device 26 is associated in each case with both separating surfaces of each separating electrode 25. With the exception of the outermost counter electrode devices 26 on the wide separating units 21 located at the outer edge, all the counter electrode devices 26 thus cooperate with two separating electrodes 25, of which one is associated with a wider separating unit 21 and the other is associated with a narrower separating unit 22. The said outermost counter electrode devices 26 additionally cooperate in each case with the inner surface of the adjacent side wall of the housing 19, which likewise serves as a separating surface and, potential-wise, is connected accordingly.

The upper side of the housing 19 of the separating device 14 is covered by an arrangement 44 of supply devices 80 which enable the separating electrodes 25 of the separating units 21, 22 to be supplied with separating fluid from above.

For a more detailed description of one of these supply means 80, reference is now made again to FIGS. 4 and 6.

The main component of the supply device 80 is a supply channel 81 which surrounds the guide rail 36 and the upper region of the separating electrode 25 and likewise extends from the front end plate 23 to the rear end plate 24. The supply channel 81 comprises two angled symmetrical profiles 82, 83 whereof the upper, horizontally extending limbs 82a, 83e abut against one another with their edges in the normal state, as shown in FIGS. 4 and 5. The lower limbs 82a, 83b of the two profiles 82, 83 converge downwards towards one another, but maintain a mutual spacing between their edges. Screwed to these lower limbs 82b, 83b are two spring steel plates 84, 85 which, during normal operation, lie resiliently with their lower edges against opposite sides of the separating electrode 25. This is the situation shown in FIG. 4 although, for illustrative purposes, a small spacing is shown here between the lower edges of the spring steel plates 84, 85 and the adjacent surfaces of the separating electrode 25.

The supply channel 81 delimited by the profiles 82, 83 and the spring steel plates 84, 85 is connected to a source of a separating fluid at a suitable point (not shown in the drawing).

The two profiles are each held in their end regions adjacent to the end plates 23, 24 with the aid of two angle brackets 86, 87 whereof the upper, substantially horizontal limbs 86a, 86b extend in the direction of the central plane of the supply device 80. Their upper sides represent actuating surfaces, as clarified below. The angle brackets 86, 87 can be pivoted about axles 88, 89 which extend between the front end plate 23 and the rear end plate 24 and are fastened to these end plates 23, 24.

A further axle 90, which is likewise mounted in the two end plates 23, 24, is connected with rotational fit and eccentrically to a cam disc 91. Rotating the axle 90 enables the cam disc 91 to be rotated between a position illustrated in FIG. 4, in which it points substantially upwards and is not in contact with the angle brackets 86, 87, and a position illustrated in FIG. 6, in which it presses the limbs 86a, 86b of the angle brackets 86, 87 downwards and the profiles 82, 83 apart. The purpose of this construction will become clear further below.

Two guide blocks 92, 93 are mounted on the outsides of the two vertical limbs of the rail 36. Actuating bolts 94, 95 extend in the vertical direction through guide bores in these guide blocks 92, 93. The actuating bolts 94, 95, which each lie on opposite sides of the central plane of the supply device 80, are connected to one another in their upper end regions by an actuating plate 96. The actuating plate 96 can be pressed downwards by an actuating mechanism, whereby the actuating bolts 94, 95 are moved downwards.

The lower ends of the actuating bolts 94, 95 are each connected to the horizontal limbs of angle profiles 97, 98 whereof the vertical limbs each support a sliding plate 99, 100. The sliding plates 99, 100 lie with their inwardly facing surfaces against opposite sides of the separating electrode 25. Their lower edge can move together with the actuating plate 96 and the actuating bolts 94, 95 between an upper position, which is illustrated in FIG. 4, and a lower position, which is illustrated in FIG. 5. In the upper position of FIG. 4, the lower edges of the sliding plates 99, 100 are located above the lower edges of the spring steel plates 84, 85 whilst, in the lower position of FIG. 5, the sliding plates 99, 100 bend the spring steel plates 84, 85 somewhat apart and their lower edges project downwards beyond the spring steel plates 84, 85.

Respective tension springs 101, 102, which seek to pull the entire arrangement of actuating plate 96, actuating bolts 94, 95, angle brackets 97, 98 and sliding plates 99, 100 upwards, act between the guide blocks 92, 93 and the horizontal limbs of the angle profiles 97, 98.

The paint booth 1 described above and, in particular, the system region 6 which serves to clean its air operate as follows:

The overspray produced when painting the vehicle body in the paint booth 2 is taken up and entrained by the air stream flowing from top to bottom through the paint booth 2. The air stream passes through the grating 4 and thus arrives in the separating chamber 9. It impacts against the deflector plates 10, 11 there or meets the separating fluid flowing uniformly along these latter. A large proportion of the overspray particles is already taken up by the separating fluid at this point. The separating fluid flows downwards along the deflector plates 11, 10 and collects in a sump 61 in the lower region of the transition chamber 12.

The air, which is still laden with overspray particles, is guided funnel-like into the transition chamber 12, firstly deflected there through 90° and then, from the transition chamber 12, introduced from the bottom into the lower inlet opening 15 of the housing 19 of the separating device 14 as a result of another 90° deflection. The separating chamber 9 and the transition chamber 12 thus form an air path between the outlet opening 3 of the paint booth 2 and the inlet opening 15 of the separating device 14.

Prior to this, the separating device was prepared for operation. On the one hand, this means that the required high voltage was applied at the counter electrode devices 26. On the other, the supply channels 81 of the different supply devices 80 were filled with separating fluid to the extent that at least the chamber located between the spring steel plates 84, 85 was filled on opposite sides of the sliding plates 99, 100 or the separating electrode 25. Care is taken here to ensure that this level of the separating fluid in the channels 81 is constantly maintained.

A cohesive layer of the separating fluid flows downwards between the lower edges of the spring steel plates 84, 85 and thus arrives on the opposite separating surfaces of the separating electrodes 25. The separating fluid flows further downwards as a uniform layer on the separating electrodes 25 and then drops from their lower edges into the sump 61 of the transition chamber 12.

The separating fluid is continuously or intermittently discharged from the sump 61 and freed of the overspray particles using a suitable process, for example by filtration. It can then be conducted back into the paint booth 1 for reuse.

As already mentioned above, the overspray-particle-laden air enters the housing 19 of the separating device 14. This air, and in particular the overspray particles entrained therein, are ionised in the region of the corona wires 27 of the different counter electrode devices 26 and, in the region of the field electrodes 29 of the counter electrode devices 26, pulled in the direction of the associated separating electrode which is at ground potential. The overspray particles are taken up here by the separating fluid which flows over the separating surface from above.

Air and separating fluid thus flow in a counter flow. As a result, the separating fluid which is most heavily laden with separated overspray particles also flows in the lower region of the separating electrodes 25 where the contamination of the air with overspray particles is the greatest. The further upwards the air moves, the cleaner it becomes. Accordingly, the separating fluid flowing over the separating electrodes 25 also becomes cleaner so that the air exiting the separating device 14 at the top has become the most clean. It can then be readily supplied by way of the air channel 17 and the collecting discharge channel 18 for reconditioning and, from there, back to the paint booth 2.

The separating fluid can be more or less viscous. The sliding plates 99, 100 are provided to promote the flow of the separating fluid out of the supply channels 81 past the lower edges of the spring steel plates 84, 85. By pressing on the actuating plate 96, these sliding plates are displaced at corresponding intervals from the upper position illustrated in FIG. 4 into the lower position illustrated in FIG. 5. With each stroke of this type, a particular quantity of the separating fluid is pressed actively outwards onto those regions of the separating surfaces of the separating electrode 25 which are lower down.

An actuating mechanism which enables this to take place is illustrated schematically in FIG. 2 and provided as a whole with the reference numeral 103. It comprises a geared motor 104, which is arranged on the outside of the housing 19 and can rotate two shafts 107, 108 back and forth through a certain angle by way of two linkages 105, 106. The shafts 107, 108 extend parallel to one another in the upper region of the housing 19 perpendicularly to the rails 36 and the supply channels 81. The shafts 107, 108 support an actuating element 109 with rotational fit for each separating unit 21, 22, which actuating element cooperates with an actuating plate 96 of a supply device 80 in a manner which is not of greater interest here. With the actuating device 103, it is clearly possible to move all sliding plates 84, 85 in the separating device 14 back and forth between their two positions.

From time to time, it may be necessary to clean the interior of the supply channels 81. The cam disc 91 is then rotated out of the position illustrated in FIG. 4 into the position illustrated in FIG. 6, which results in the spring steel plates 84, 85 being lifted away from the separating surfaces of the separating electrode 25. Fluid contained in the guide channel 81 can thus flow out easily; moreover, the interior of the guide channel 81 is accessible for cleaning. The mechanism by which the axle 90 and therefore the cam discs 91 can be rotated is not shown in the drawing.

FIGS. 7 to 10 show a second exemplary embodiment of a supply device which can be used to supply separating fluid to the separating surfaces of a separating electrode. The embodiment of FIGS. 7 to 10 is structurally more simple than that of FIGS. 1 to 6, although its performance is substantially the same. Components of the second embodiment which correspond to those of the first are denoted by the same reference numerals plus 100.

Figure 8:
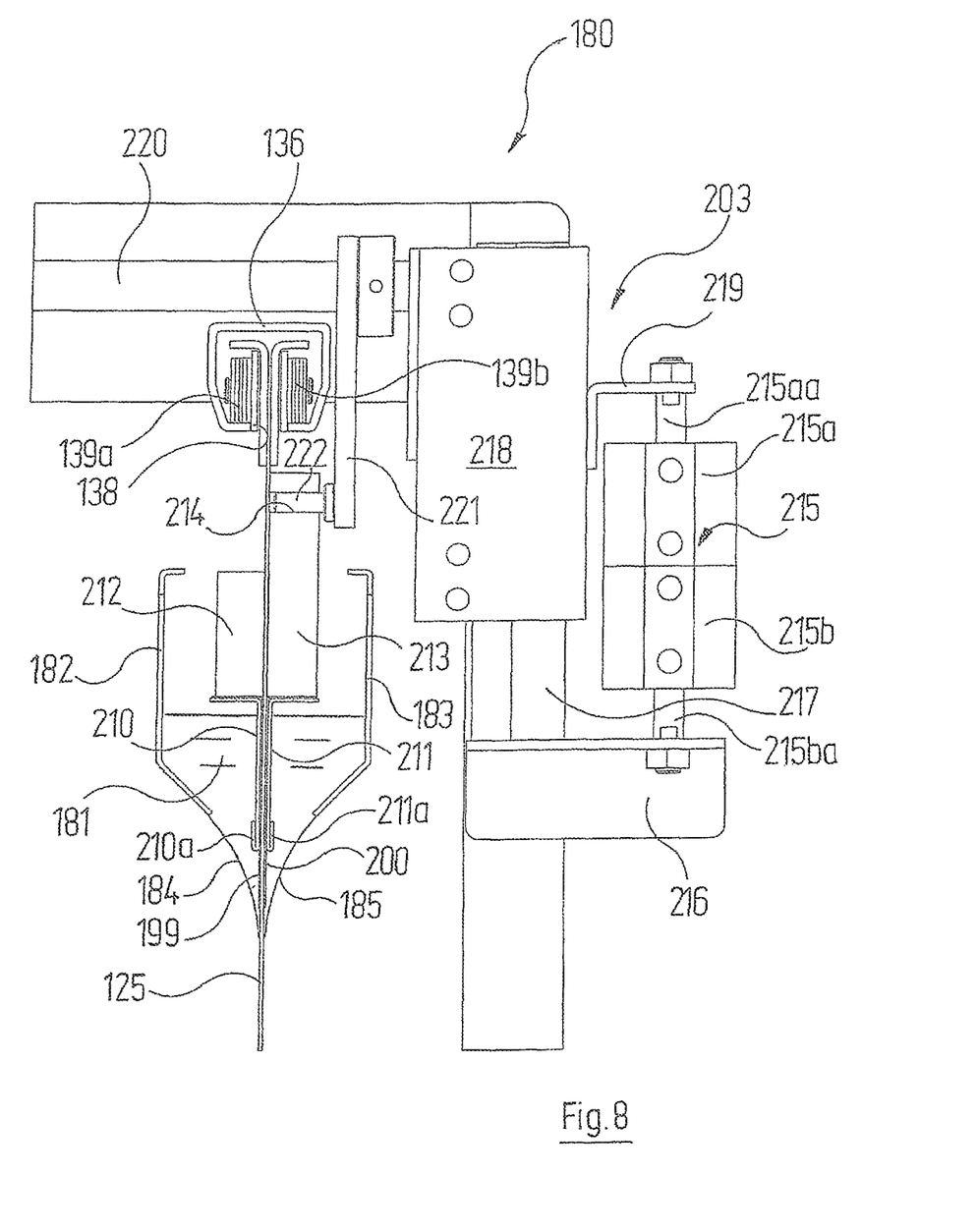
FIGS. 8 to 10 the end view of the supply device of FIG. 7, again in different operating positions together with an actuating device.
Figure 9:
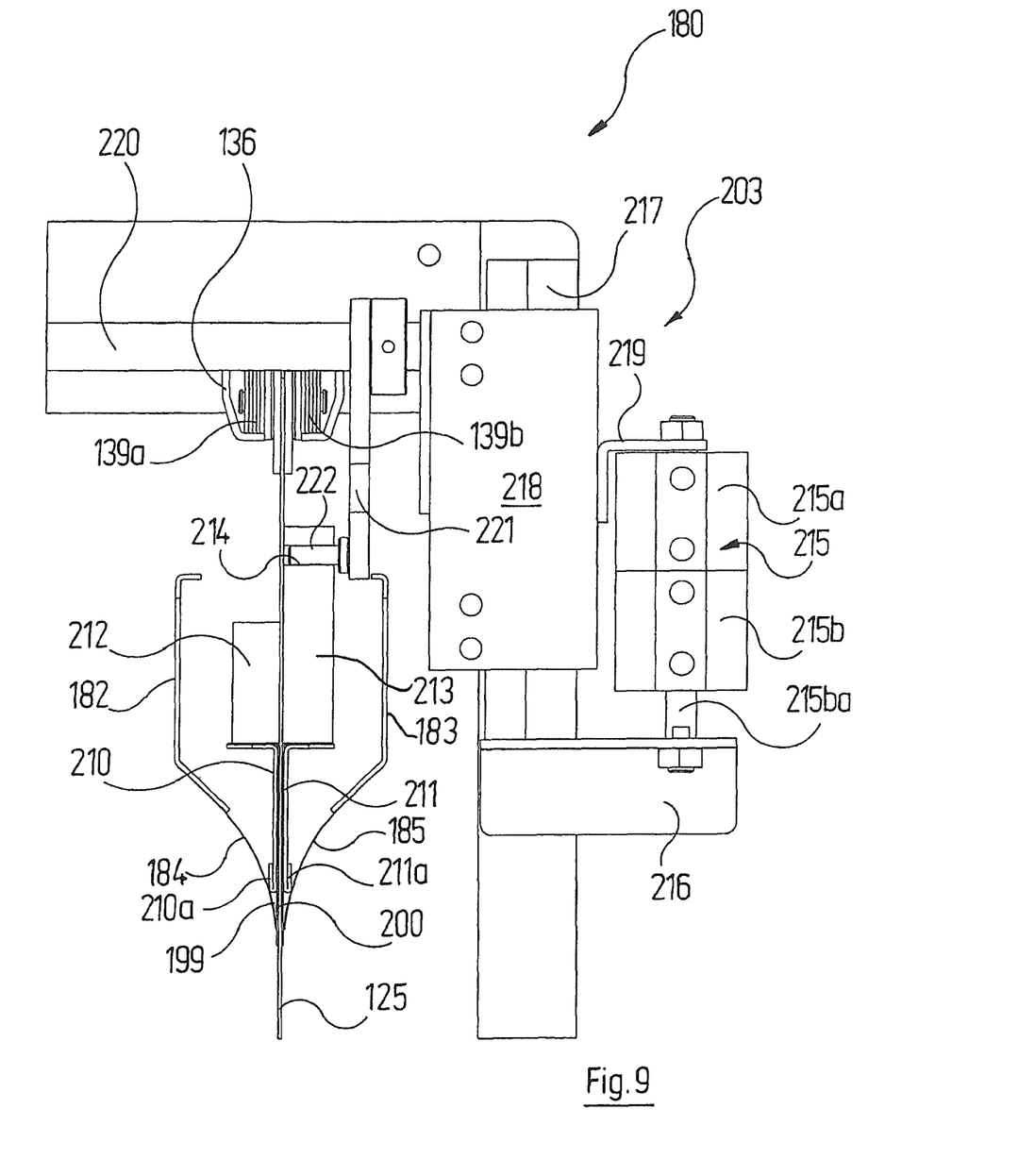
Figure 10:
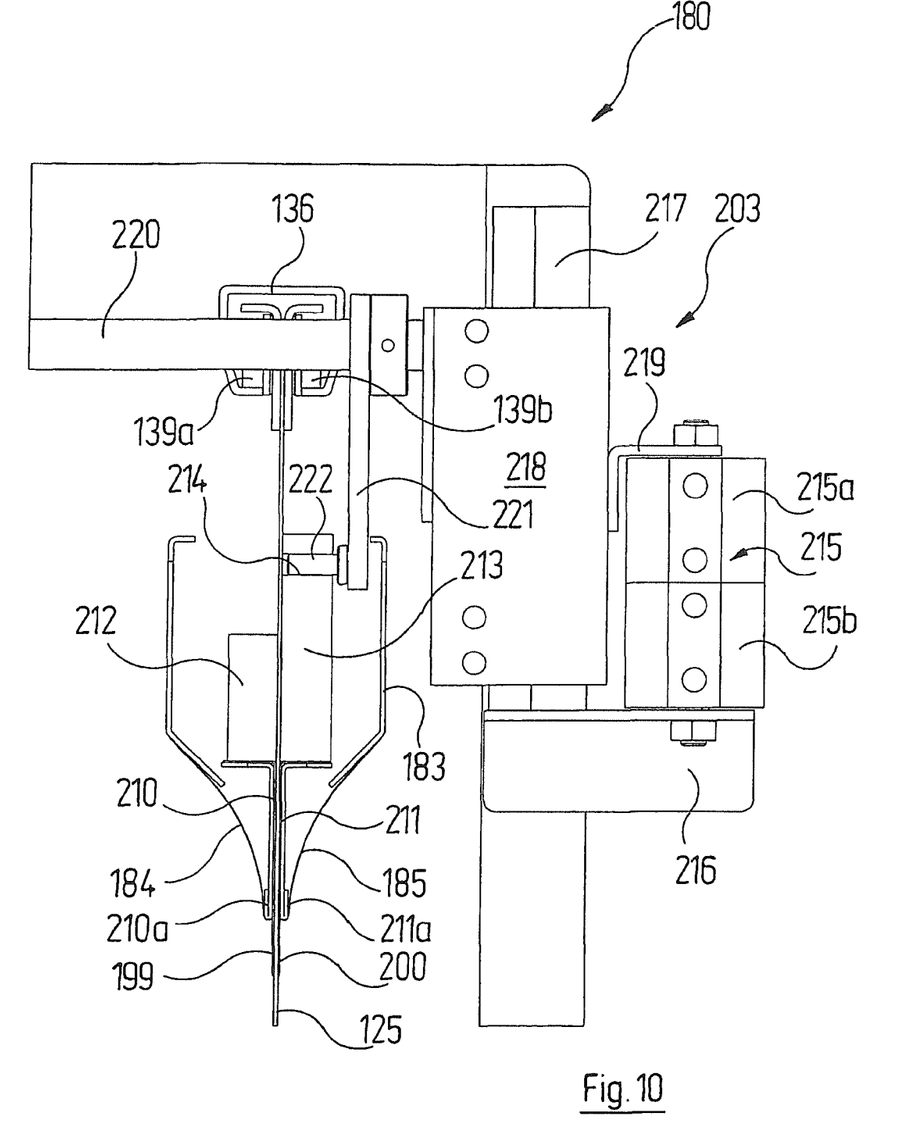

In FIGS. 8 to 10, the hollow profile 136 forming a rail with the gap 138 in the underside are reproduced substantially identically. The upper region of a separating electrode 125 again extends upwards through the gap 138 into the interior of the rail 136. Roller pairs 139a, 139b are mounted on the separating electrode 125 here and run along the two lower flanges of the rail 136. The supply device 180 again comprises a supply channel 181 which is connected in some way to a source of a separating fluid. The supply channel 181 is in turn delimited by two profile plates 182, 183 and by two spring steel plates 184, 185 fastened to lower limbs of the profile plates 182, 183. The spring steel plates 184, 185 are not screwed on in this case, but secured by adhesive.

Contrary to the exemplary embodiment of FIGS. 1 to 6, the profile plates 182, 183 are stationary and are connected at both opposite ends to a respective end wall of the corresponding separating unit.

The lower edges of the spring steel plates 184, 185 lie against the lateral separating surfaces of the separating electrode 125 in their normal state.

The exemplary embodiment of FIGS. 7 to 10 also has two sliding plates 199, 200 which lie displaceably against the separating electrode 125 on opposite sides and can be displaced between different positions shown in FIGS. 8 to 10.

A respective angled spacer plate 210 and 211 is arranged on the outer surfaces of the two sliding plates 199, 200 and has, in its lower region, rectangular downwardly protruding projections 210a and 211a which are bent back on themselves to produce an edge region with a thickness which corresponds to approximately double the plate thickness. The projections 210a, 211a can be at different or identical spacings from one another. Windows 230, which enable the levels of the separating fluid located on both sides of the separating electrode 125 to be equalised, are located in the sliding plates 199, 200 and, in the position shown in FIG. 7, also in the separating electrode 125 such that they are in alignment with the spacings between adjacent projections 210a, 211a.

The upper, horizontally bent limbs of the spacer plates 210, 211 are mounted together with the upper horizontally extending limbs of the sliding plates 199, 200 on blocks 212, 213 between which the separating electrode 125 can move through in sliding manner. An entrainment opening 214, the purpose of which is clarified below, is formed in the right-hand block 213 as seen in FIGS. 8 to 10.

The sliding plates 199, 200 are moved back and forth by an actuating device 203 which has a double-acting hydraulic or pneumatic short stroke cylinder 215 as an energy source. The double-acting short stroke cylinder 215 is composed of two short stroke cylinders 215a, 215b which are mutually inversely arranged and are secured to one another by their housings. The piston rod 215ba of the lower short stroke cylinder 215b is secured to a part 216 which is in turn fixedly connected to the housing of the separating device.

A vertically extending guide rail 217, on which a movable carriage 218 is guided, is likewise rigidly mounted on the housing. The carriage 218 is connected with movable fit to the piston rod 215aa of the upper short stroke cylinder 215a by way of an angle plate 219.

A rod 220, on which a plurality of downwardly projecting carrier arms 221 are mounted, extends between the carriage 218 and a corresponding carriage (not shown in the drawing) which is provided on the opposite side of the separating device. A carrier arm 221 of this type is provided for each separating unit. It reaches with a horizontally extending carrier pin 222 into the entrainment opening 214 of the block 213 of the corresponding separating unit. As explained in more detail below, all sliding plates 199, 200 can clearly be moved back and forth together with all spacer plates 210, 211 as a result of actuating the double-acting short stroke piston 215.

FIG. 8 shows the "normal" operating situation. In this, the lower edges of the spring steel plates 184, 185 lie against the opposite separating surfaces of the separating electrode 125. The spring steel plates 184, 185 contain separating fluid which, as with the first exemplary embodiment, is subsequently delivered as required in order to maintain an approximately constant level in the supply channel 181. The lower edges of the sliding plates 199, 200 are located above the lower edges of the spring steel plates 184, 185 and the lower edge of the spacer plates 210, 211 is even higher.

To now promote the flow of separating fluid out of the supply channel 181 as required, the sliding plates 199, 200 are pushed downwards by a corresponding actuation of the upper short stroke cylinder 215a to the extent that the lower edges slide under the lower edges of the spring steel plates 184, 185, as shown in FIG. 9. Upon this stroke movement, a certain quantity of the separating fluid is in turn actively brought out of the supply channel 181 downwards onto the opposite separating surfaces of the separating electrode 125. However, the lower edges of the spacer plates 210, 211 remain at a height where they do not have any influence on the position and form of the spring steel plates 184, 185. The sliding plates 199, 200—and in time with this—the spacer plates 210, 211 alternate back and forth between the two positions shown in FIG. 8 and FIG. 9.

If cleaning of the supply channel 181 is desired, the sliding plates 199, 200 are pushed downwards with the spacer plates 210, 211 with the aid of the lower short stroke cylinder 215b until the lower, thickened edge regions of the spacer plates 210, 211 bend the lower edges of the spring steel plates 184, 185 apart. The separating fluid located in the supply channel 181 can now run off easily through the clearances between the projections 210a, 211a.

Figure 7:
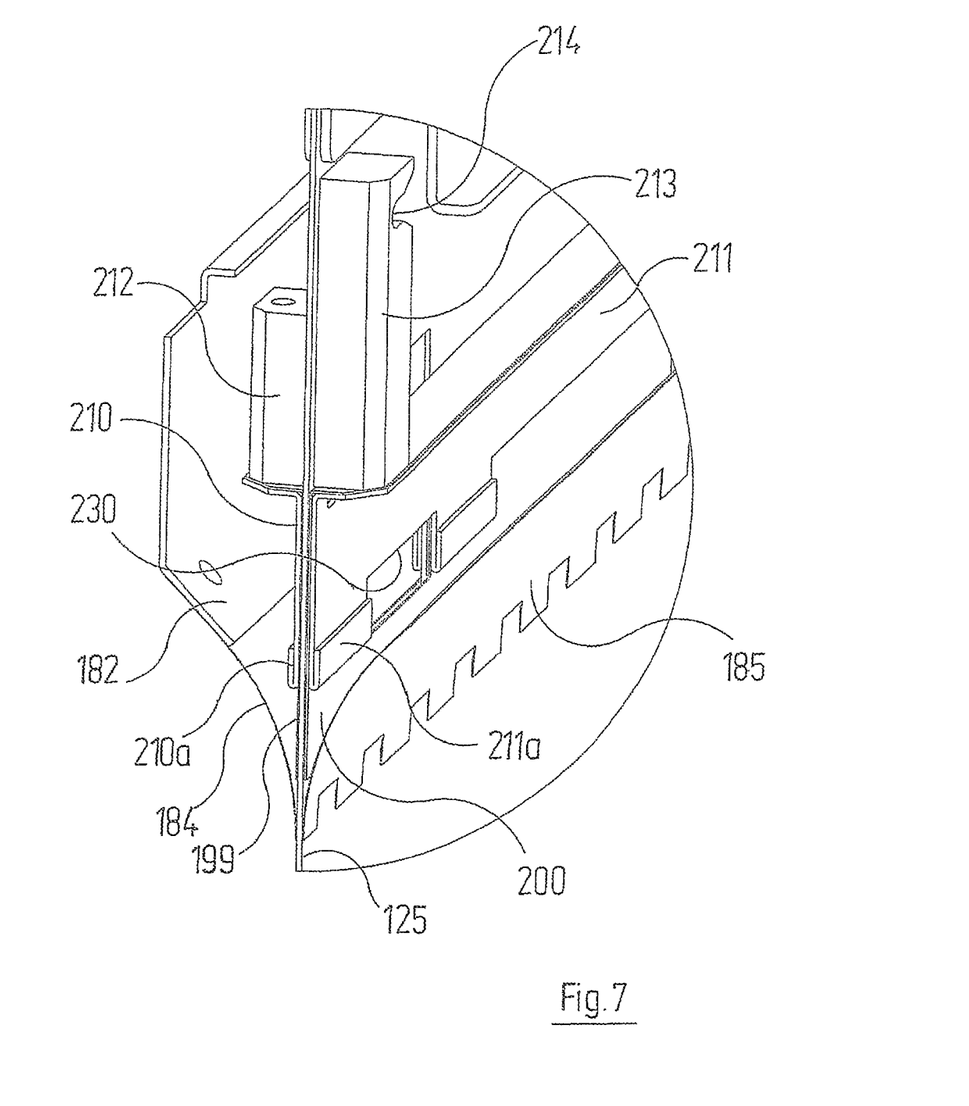
FIG. 7 a perspective view of an alternative exemplary embodiment of a supply device for a separating fluid.

The perspective view of the supply device 180 shown in FIG. 7 illustrates a particular feature which could also be realised in the exemplary embodiment of FIGS. 1 to 6: The lower edge of the spring steel plates 184, 185 is namely designed such that it is not linear here, but crenellated. The spring steel plates 184, 185 therefore lie only with the lower edges of the crenellated, downwardly pointing projections against the separating electrode 125. This measure also serves to promote the flow of separating fluid from the supply channel 181, particularly when the separating fluid is relatively viscous.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

The invention claimed is:

1. A system for coating objects comprising:
   a) a coating booth in which objects are acted upon by coating material and through which an air stream is conveyed which takes up overspray particles of the coating material and conveys the overspray particles away;
   b) an electrostatically operating separating device whereof a housing of which has an inlet opening for the overspray-particle-laden air and an outlet opening for cleaned air, wherein at least one separating electrode, which has a separating surface, and a counter electrode device are arranged in the housing;
   c) a high voltage source whereof poles of which are connected to the separating electrode or the counter electrode device;
   d) an air path for the overspray-particle-laden air, which leads from a base of the coating booth to the inlet opening of the separating device;

wherein
   e) a supply device is associated with each separating electrode and enables separating fluid to be supplied to an upper region of each separating surface of the separating electrode in such a way that the separating fluid flows extensively over each separating surface of the separating electrode;
   f) the supply device has a supply channel which is filled to a certain level with separating fluid and is formed in a lower region by two spring steel plates which lie at least sometimes and at least partially with their respective lower edges against opposite operating surfaces of the separating electrode;

and the system further comprising:

g) two sliding plates, which lie displaceably against opposite separating surfaces of the separating electrode to insure flow from the supply channel; and, h) an actuating device by means of which the sliding plates are moved back and forth between a position in which lower edges of the two sliding plates are located above the lower edges of the spring steel plates and a position in which the lower edges of the two sliding plates are located below the lower edges of the spring steel plates.

2. The system according to claim 1, wherein the lower edges of the spring steel plates have a crenellated shape or resemble a blunt comb.

3. The system according to claim 1, further comprising:
a device by means of which the lower edges of the two spring steel plates are moved away from the system at the separating surfaces of the separating electrode to allow the separating fluid within the supply channel to run out.

4. A system for coating objects comprising:

a) a coating booth in which objects are acted upon by coating material and through which an air stream is conveyed which takes up overspray particles of the coating material and conveys the overspray particles away;

b) an electrostatically operating separating device whereof a housing of which has an inlet opening for the overspray-particle-laden air and an outlet opening for cleaned air, wherein at least one separating electrode, which has a separating surface, and a counter electrode device are arranged in the housing;

c) a high voltage source whereof poles of which are connected to the separating electrode or the counter electrode device;

d) an air path for the overspray-particle-laden air, which leads from a base of the coating booth to the inlet opening of the separating device;

wherein e) a supply device is associated with each separating electrode and enables separating fluid to be supplied to an upper region of each separating surface of the separating electrode in such a way that the separating fluid flows extensively over each separating surface of the separating electrode;

f) the supply device has a supply channel which is filled to a certain level with separating fluid and is formed in a lower region by two spring steel plates which lie at least sometimes and at least partially with their respective lower edges against opposite operating surfaces of the separating electrode;

and the system further comprising:

g) two sliding plates, which lie displaceably against opposite separating surfaces of the separating electrode;

h) an actuating device by means of which the sliding plates are moved back and forth between a position in which lower edges of the two sliding plates are located above the lower edges of the spring steel plates and a position in which the lower edges of the two sliding plates are located below the lower edges of the spring steel plates;

the system further comprising:

i) a device by means of which the lower edges of the two spring steel plates are moved away from the system at the separating surfaces of the separating electrode to allow the separating fluid within the supply channel to run out.

\* \* \* \* \*